United States Patent
Chiu et al.

(10) Patent No.: US 7,495,401 B2
(45) Date of Patent: Feb. 24, 2009

(54) CONTROL SYSTEMS AND SWITCH DEVICES THEREOF

(75) Inventors: Chin-Fa Chiu, Taoyuan Hsien (TW); Chun-Lung Chiu, Taoyuan Hsien (TW); Ming-Shi Tsai, Taoyuan Hsien (TW); Wen-Shi Huang, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 133 days.

(21) Appl. No.: 11/606,079

(22) Filed: Nov. 30, 2006

(65) Prior Publication Data

US 2007/0132412 A1  Jun. 14, 2007

(30) Foreign Application Priority Data

Dec. 8, 2005 (TW) ............................... 94143296 A

(51) Int. Cl.
*H02P 7/06* (2006.01)
*H02P 6/00* (2006.01)
(52) U.S. Cl. .................. 318/400.01; 318/432; 318/479
(58) Field of Classification Search ............. 318/700, 318/400.01, 430–434, 474, 478, 479
See application file for complete search history.

(56) References Cited

U.S. PATENT DOCUMENTS

| 3,603,857 | A | * | 9/1971 | Crane et al. ................ 388/816 |
| 3,667,018 | A | * | 5/1972 | Rakes ....................... 318/400.4 |
| 4,145,647 | A | * | 3/1979 | Nielsen et al. ............. 318/810 |
| 4,307,326 | A | * | 12/1981 | Fukushima et al. ......... 388/847 |
| 4,329,630 | A | * | 5/1982 | Park ........................... 318/258 |
| 4,359,674 | A | * | 11/1982 | Gotou ................... 318/400.07 |
| 4,527,102 | A | * | 7/1985 | Gotou ................... 318/400.01 |
| 5,221,885 | A | * | 6/1993 | Molieri et al. .............. 318/685 |
| 5,268,623 | A | * | 12/1993 | Muller ........................ 318/434 |
| 2003/0197483 | A1 | * | 10/2003 | Horng et al. ................ 318/825 |

* cited by examiner

*Primary Examiner*—Bentsu Ro
(74) *Attorney, Agent, or Firm*—Birch, Stewart, Kolasch & Birch, LLP

(57) ABSTRACT

A control system for a motor. The control system and the motor receive an external power. The control system comprises a driver and a switch device. The driver is electrically connected to the motor. The switch device is electrically connected between the external power and the driver and turned on or off according to a control signal. The driver drives the motor according to the external power when the switch device is turned on.

18 Claims, 4 Drawing Sheets

CONTROL SYSTEMS AND SWITCH DEVICES THEREOF

BACKGROUND OF THE INVENTION

1. Field of the Invention

The present invention relates to a control system and a switch device thereof, and in particular relates to a control system and a switch device for a motor.

2. Description of the Related Art

Referring to FIG. 1, a conventional control system 2 is electrically connected to a motor 1 and controls the operation of the motor 1 according to an external power $V_{IN}$. The control system 2 comprises a driver 10, a switch element S, a filter capacitor $C_S$, a first diode $D_1$, and a second diode $D_2$. The switch element S is electrically connected to the external power $V_{IN}$. The first diode $D_1$ is electrically connected between the switch element S and the motor 1. The second diode $D_2$ is electrically connected to the switch element S. The driver 10 is electrically connected between the second diode $D_2$ and the motor 1. One terminal of the filter capacitor $C_S$ is electrically connected between the first diode $D_1$ and the motor 1, and the other terminal thereof is electrically connected to a ground. When the switch element S is turned on, the external power $V_{IN}$ is transmitted to the filter capacitor $C_S$ and the driver 10 respectively through the first diode $D_1$ and the second diode $D_2$. When the filter capacitor $C_S$ is filled with charge, a start current is provided to the motor 1. The driver 10 provides a driving signal to the motor 1 according to the external power $V_{IN}$ to drive the motor 1. The driving signal can be a pulse width modulation (PWM) signal.

When the control system 2 controls the motor 1 to start driving, some problems usually occur. When the switch element S is switched to a turned-on state from a turned-off state, the motor 1 and the filter capacitor $C_S$ can be damaged by an in-rush current generated due to the state switch. Moreover, the cost of the switch element S is high since it has to take a larger flowing-through current.

BRIEF SUMMARY OF THE INVENTION

An exemplary embodiment of a control system is electrically connected to a motor. The control system and the motor receive an external power. The control system comprises a driver and a switch device. The driver is electrically connected to the motor. The switch device is electrically connected between the external power and the driver and turned on or off according to a control signal. The driver drives the motor according to the external power when the switch device is turned on.

An exemplary embodiment of a switch device is electrically connected to a driver which drives a motor. The switch device and the motor receive an external power. The switch device comprises a first switch circuit and a second switch circuit. The first switch circuit is electrically connected between the external power and the driver. The second circuit is electrically connected to the first switch circuit and receives the control signal to turn the first switch circuit on or off. The driver drives the motor when the first switch circuit is turned on.

According to the described exemplary embodiments of a control system and a switch device for a motor, the switch device controls a driver to function or not and then controls the operation of the motor. Since the motor receives an external power continuously, the disadvantageous transition between charging and discharging of a filter capacitor does not require consideration. Moreover, elements taking a larger flowing-through current can be omitted, thus cost can be reduced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
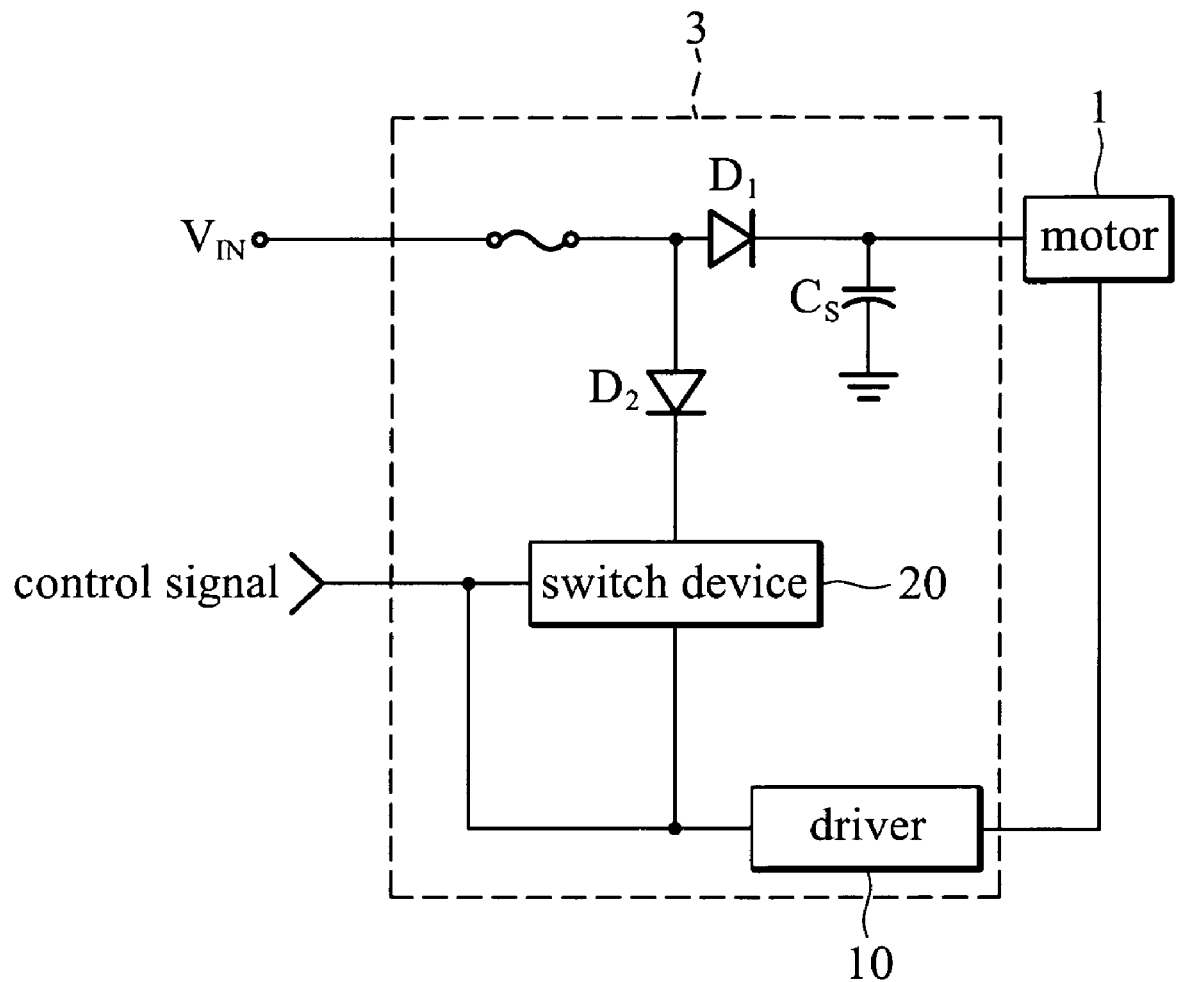
FIG. 2 shows an embodiment of a control system.

In an exemplary embodiment of a control system for a motor in FIG. 2, a control system 3 is electrically connected to a motor 1. Both the control system 3 and the motor 1 receive an external power $V_{IN}$. In the embodiment of FIG. 2, the motor 1 can be a DC brushless motor, and the external power $V_{IN}$ can be a power supply.

Referring to FIG. 2, the control system 3 comprises a driver 10 and a switch device 20. The driver 10 is electrically connected to the motor 1. The switch device 20 is electrically connected between the external power $V_{IN}$ and the driver 10.

In the embodiment of FIG. 2, the driver 10 can be a single-chip element or an integrated circuit element. The driver 10 outputs a driving signal to drive the motor 1. The driving signal can be a square wave, particularly a pulse width modulation (PWM) signal in this embodiment.

In the embodiment of FIG. 2, an external control signal is provided to the switch device 20 to turn the switch device 20 on or off. The control signal can be a square wave, particularly in this embodiment, the signal is a pulse width modulation (PWM) signal. When the control signal turns on the switch device 20, the driver 10 drives the motor 1 according to the external power $V_{IN}$. Conversely, when the control signal turns off the switch device 20, the driver 10 does not generate the driving signal to drive the motor 1 because the external power $V_{IN}$ is not input.

Figure 1:
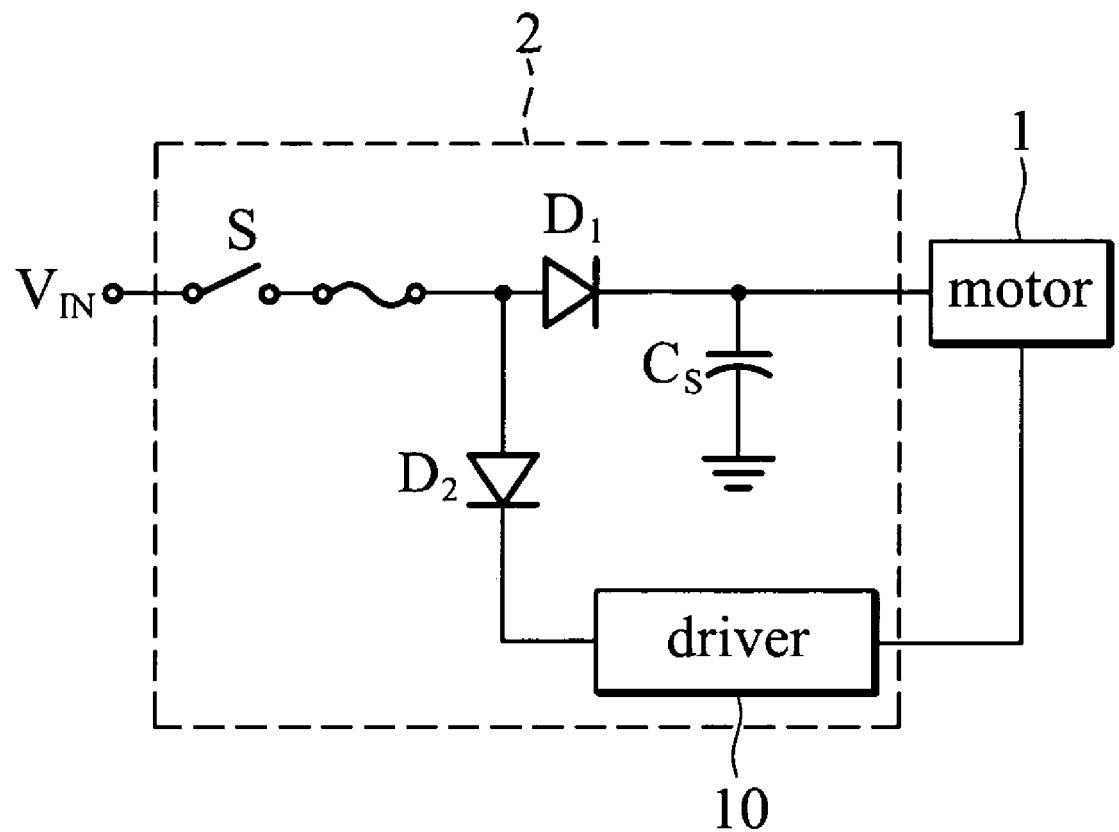
FIG. 1 shows a conventional control system for a motor.

In FIG. 2, the connection between the first diode $D_1$, the filter capacitor $C_S$, the motor 1, and the external power $V_{IN}$ is the same as FIG. 1, thus the description is omitted here. In the embodiment of FIG. 2, one terminal of the second diode $D_2$ is electrically connected between the external power $V_{IN}$ and the first diode $D_1$, and the other terminal thereof is electrically connected to the switch device 20.

Figure 3:
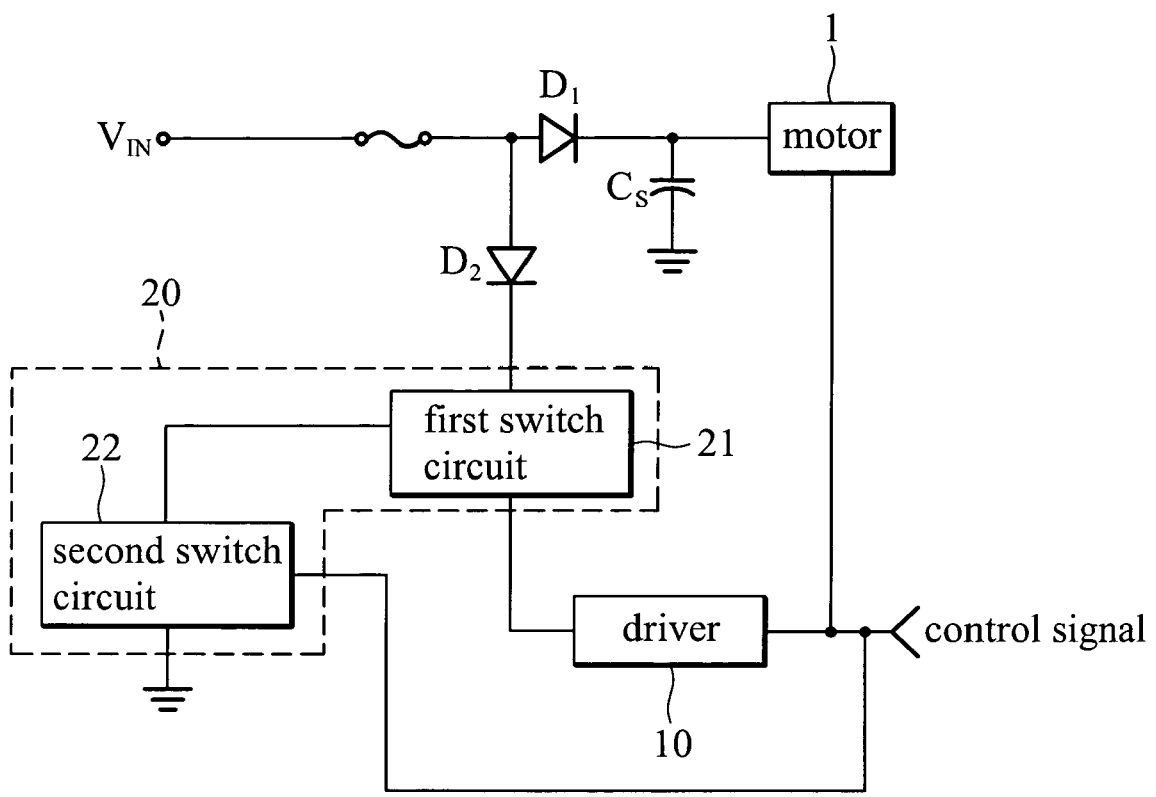
FIG. 3 shows a switch device of the control system in FIG. 2.

Referring to FIG. 3, the switch device 20 comprises a first switch circuit 21 and a second switch circuit 22. The first switch circuit 21 is electrically connected between the second diode $D_2$ and the driver 10. The second switch circuit 22 is electrically connected between the first switch circuit 21 and a ground and receives the control signal. When the second switch circuit 22 is turned on, the first switch circuit 21 is also turned on, so that the external power $V_{IN}$ is input to the driver 10. Conversely, when the second switch circuit 22 is turned off, the first switch circuit 21 is also turned off, so that the driver 10 can not receive the external power $V_{IN}$.

Figure 4:
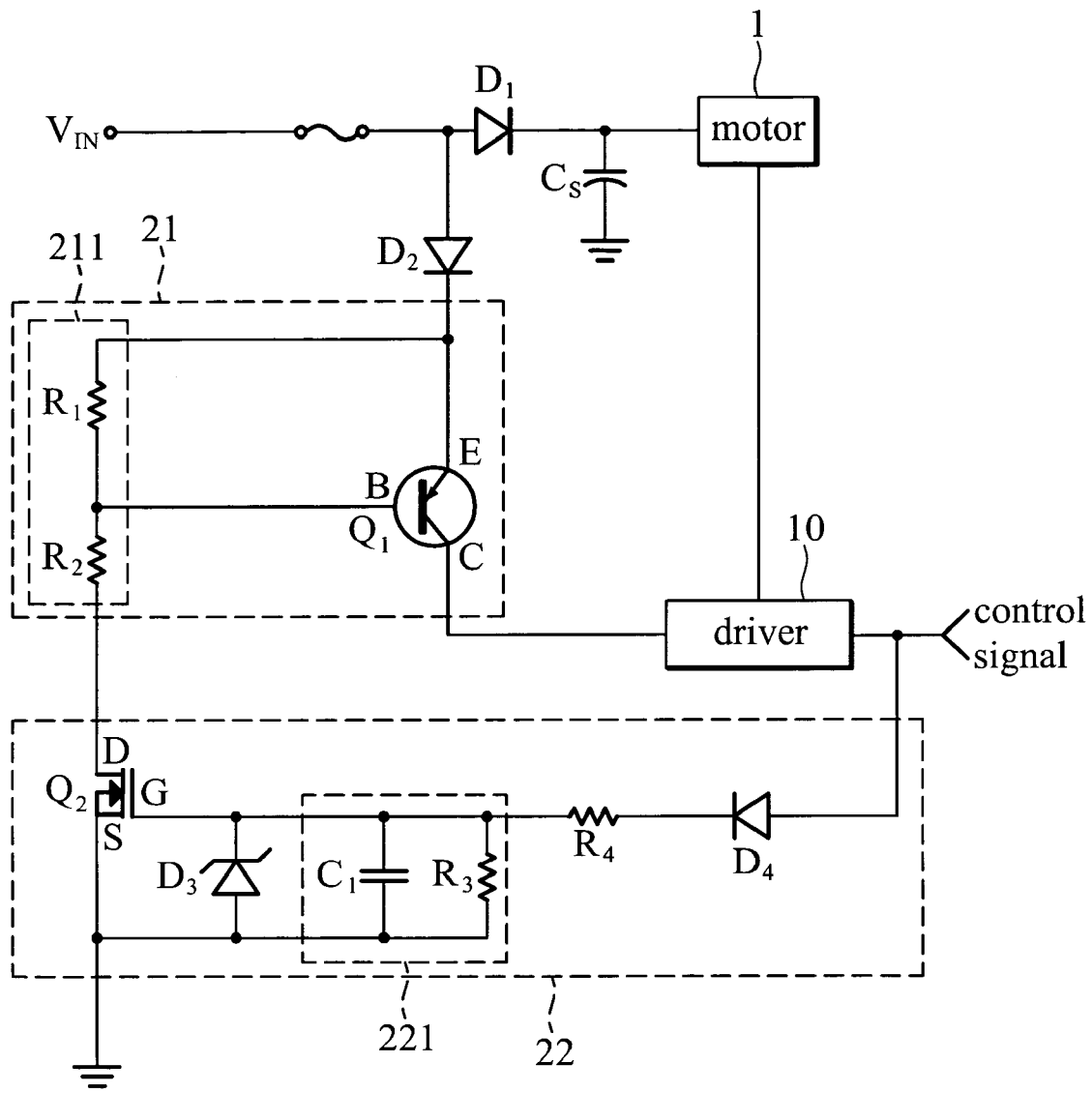
FIG. 4 shows a circuit of the switch device in FIG. 3.

Referring FIG. 4, the first switch circuit 21 comprises a first switch element $Q_1$ and a voltage divider 211. The second switch circuit 22 comprises a second switch element $Q_2$ and a regulator 221.

The first switch element $Q_1$ is electrically connected between the second diode $D_2$ and the driver 10. The voltage divider 211 receives the control signal to turn the first switch element $Q_1$ on or off.

In the embodiment of FIG. 4, the first switch element $Q_1$ is a PNP transistor, and the voltage divider 211 comprises a first resistor $R_1$ and a second resistor $R_2$ which are electrically connected in series. A collector C of the first switch element $Q_1$ is electrically connected to the driver 10, and an emitter E thereof and the first resistor $R_1$ are electrically connected to the second diode $D_2$. A base B of the first switch element $Q_1$ is electrically connected between the first resistor $R_1$ and the second resistor $R_2$, and the base B is enabled by the divided voltage to turn on the first switch element $Q_1$.

The second switch element $Q_2$ is electrically connected between the second resistor $R_2$ and the regulator 221. The regulator 221 receives the control signal to turn the second switch element $Q_2$ on or off.

In the embodiment of FIG. 4, the second switch element $Q_2$ is a NMOS transistor, and the regulator 221 comprises a third resistor $R_3$ and a first capacitor $C_1$. A drain D of the second switch element $Q_2$ is electrically connected to the second resistor $R_2$, and a source S thereof is electrically connected to the ground. One terminal of the first capacitor $C_1$ and the third resistor $R_3$ are electrically connected to a gate G of the second switch element $Q_2$, and the other terminal thereof is electrically connected to the source S of the second switch element $Q_2$.

It is noted that a normal value is determined by regulating the resistance of the resistor $R_3$ and the capacitance of the capacitor $C_1$. When the control signal rises or falls to the normal value, the second switch element $Q_2$ is turned off, and the first switch element $Q_1$ is accordingly turned off. The driver 10 does not receive the external power $V_{IN}$ and stops driving the motor 1. For example, the control signal is a PWM signal, and users can set the normal value to a 20% duty cycle (80% duty cycle in an inverse input). When the duty cycle of the control signal is larger than 20% (smaller than 80% in an inverse input), the second switch element $Q_2$ is turned on. When the duty cycle of the control signal is smaller than 20% (larger than 80% in an inverse input), the second switch element $Q_2$ is turned off.

Referring to FIG. 4, the second switch element $Q_2$ further comprises a third diode $D_3$, a fourth diode $D_4$, and a fourth resistor $R_4$. One terminal of the third diode $D_3$ is electrically connected to the gate G of the second switch element $Q_2$, and the other terminal thereof is electrically connected to the source S of the second switch element $Q_2$. The fourth diode $D_4$ receives the control signal. The fourth resistor $R_4$ is electrically connected between the regulator 221 and the fourth diode $D_4$. The fourth diode $D_4$ can prevent reverse current, and the fourth resistor $R_4$ can serve as a current limiter.

As described, a switch device of a control system determines whether an external power is provided to a driver or not according to a control signal. When the switch device is turned on according to the control signal, the external power is provided to the driver to drive a motor. When the switch device is turned off according to the control signal, the external power is not provided to the driver, so that the motor is not driven by the driver. Since the motor and a filter capacitor are always electrically connected to the external power, an in-rush current is not generated. Moreover, the described embodiments do not require switch elements to take large flow-through currents, thus decreasing cost and increasing efficiency.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control system electrically connected to a motor, the control system and the motor receiving an external power, the control system comprising:
    a driver electrically connected to the motor; and
    a switch device, electrically connected between the external power and the driver and turned on or off according to a control signal, comprising:
        a first switch circuit and a second switch circuit, the first switch circuit being electrically connected between the external power and the driver, and the second switch circuit being electrically connected to the first switch circuit and receiving the control signal to turn the first switch circuit on or off;
    wherein the driver drives the motor according to the external power when the switch device is turned on, and the first switch circuit comprises a first switch element and a voltage divider, the first switch element is electrically connected between the external power and the driver, and the voltage divider receives the external power to turn the first switch element on or off.

2. The control system as claimed in claim 1, wherein the driver is a single-chip or an integrated circuit.

3. The control system as claimed in claim 1, wherein the driver drives the motor with a square wave or a pulse width modulation (PWM) signal.

4. The control system as claimed in claim 1, wherein the switch device comprises a regulator for stopping the motor driving when the control signal rises or falls to a specific value.

5. The control system as claimed in claim 1, further comprising a first diode electrically connected between the external power and the motor.

6. The control system as claimed in claim 1, further comprising a second diode electrically connected between the external power and the driver.

7. The control system as claimed in claim 1, wherein the first switch element is a PNP transistor.

8. The control system as claimed in claim 7, wherein the voltage divider comprises a first resistor and a second resistor, a base of the first switch element is electrically connected between the first resistor and the second resistor, an emitter thereof is electrically connected to the external power, and a collector thereof is electrically connected to the driver.

9. The control system as claimed in claim 1, wherein the second switch circuit comprises a second switch element and a regulator, the second switch element is electrically connected to the first switch element, and the regulator is electrically connected to the second switch element and receives the control signal to turn the second switch element on or off.

10. The control system as claimed in claim 9, wherein the second switch element is an NMOS transistor.

11. The control system as claimed in claim 10, wherein a drain of the second switch element is electrically connected to the first switch circuit, a gate thereof is electrically connected to one terminal of the regulator, and a source thereof is electrically connected to the other terminal of the regulator and a ground.

12. The control system as claimed in claim 11, wherein the second switch circuit further comprises a third diode, one terminal of the third diode is electrically connected to the gate of the second switch element, and the other terminal thereof is electrically connected to the source of the second switch element.

13. The control system as claimed in claim 9, wherein the second switch circuit further comprises a fourth diode and a fourth resistor, the fourth diode receives the control signal, and the fourth resistor is electrically connected between the regulator and the fourth diode.

14. The control system as claimed in claim 9, wherein the regulator stops driving the motor when the control signal rises or falls to a specific value.

15. The control system as claimed in claim 14, wherein the regulator comprises a third resistor and a first capacitor electrically connected in parallel.

16. The control system as claimed in claim 1, wherein the control signal is a square wave or a pulse width modulation (PWM) signal.

17. The control system as claimed in claim 1, wherein the motor is a DC brushless motor.

18. A switch device electrically connected to a driver which drives a motor, the switch device and the motor receiving an external power, the switch device comprising:
   a first switch circuit electrically connected between the external power and the driver; and
   a second circuit electrically connected to the first switch circuit and receiving the control signal to turn the first switch circuit on or off;
   wherein the driver drives the motor when the first switch circuit is turned on, and the first switch circuit comprises a first switch element and a voltage divider, the first switch element is electrically connected between the external power and the driver, and the voltage divider receives the external power to turn the first switch element on or off.

* * * * *